United States Patent
Carey et al.

(10) Patent No.: US 8,465,389 B2
(45) Date of Patent: Jun. 18, 2013

(54) CLUTCH AND GEAR ARRANGEMENT FOR A FRONT WHEEL DRIVE VEHICLE

(75) Inventors: Clinton E. Carey, Highland, MI (US);
Scott H. Wittkopp, Ypsilanti, MI (US);
James M. Hart, Belleville, MI (US);
Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/479,354

(22) Filed: May 24, 2012

(65) Prior Publication Data

US 2012/0231919 A1    Sep. 13, 2012

Related U.S. Application Data

(62) Division of application No. 12/405,297, filed on Mar. 17, 2009, now Pat. No. 8,202,191.

(51) Int. Cl.
*F16H 3/62* (2006.01)

(52) U.S. Cl.
USPC .......................................... 475/277; 475/282

(58) Field of Classification Search
USPC .................................................. 475/277, 282
See application file for complete search history.

(56) References Cited

U.S. PATENT DOCUMENTS

| | | |
|---|---|---|
| 4,702,125 A | 10/1987 | Kalns |
| 6,913,556 B2 | 7/2005 | Armstrong et al. |
| 6,960,150 B2 | 11/2005 | Armstrong et al. |
| 7,699,736 B2 | 4/2010 | Diosi et al. |
| 7,789,792 B2 | 9/2010 | Kamm et al. |
| 2010/0022345 A1 | 1/2010 | Reaser et al. |
| 2010/0240489 A1 | 9/2010 | Carey et al. |

FOREIGN PATENT DOCUMENTS

| | | |
|---|---|---|
| CN | 2475657 Y | 2/2002 |
| CN | 101103212 A | 1/2008 |
| DE | 202006011424 U1 | 2/2007 |

*Primary Examiner* — Justin Holmes
*Assistant Examiner* — Jacob S Scott

(57) ABSTRACT

A front wheel drive transmission is provided having an input member, an output member, four planetary gear sets, a plurality of coupling members and a plurality of torque transmitting devices. Each of the planetary gear sets includes a sun gear member, a planet carrier member, and a ring gear member. The torque transmitting devices include clutches and brakes arranged within a transmission housing. Each of the clutches and the brakes are located within specific areas defined by the planetary gear sets and the housing walls.

18 Claims, 7 Drawing Sheets

| Clutch | Zone Location | | | | | |
|---|---|---|---|---|---|---|
| | A | B | C | D | E | F |
| 34 | X | X | | | | X |
| 36 | X | X | X | | | X |
| 30 | | | X | X | X | |
| 32 | | | X | X | X | X |
| 28 | | | X | X | X | X |

US 8,465,389 B2

CLUTCH AND GEAR ARRANGEMENT FOR A FRONT WHEEL DRIVE VEHICLE

CROSS-REFERENCE TO RELATED APPLICATION

This application is a divisional of U.S. patent application Ser. No. 12/405,297 filed on Mar. 17, 2009. The disclosure of the above application is incorporated herein by reference.

FIELD

The invention relates generally to a multiple speed transmission having a plurality of planetary gear sets and a plurality of torque transmitting devices and more particularly to a transmission configured for a front wheel drive vehicle having eight or more speeds, five torque transmitting devices, and four planetary gear sets.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

In one aspect of the present invention, a transaxle is provided having a transmission input member, a transmission output member, a plurality of planetary gear sets, and a plurality of torque-transmitting mechanisms.

In another aspect of the present invention, the transaxle includes an input member, an output member, a housing having a first wall, a second wall, and a third wall extending between the first and second walls. First, second, third and fourth planetary gear sets are disposed within the housing, wherein the first planetary gear set is adjacent the first wall, the third planetary gear set is adjacent second wall, the fourth planetary gear set is adjacent the first planetary gear set and the second planetary gear set is between the fourth and third planetary gear sets. Each planetary gear set has a sun gear member, a ring gear member, and a planet carrier member supporting a plurality of planet gears each configured to intermesh with both the sun gear member and the ring gear member, and the sun gear member of the first planetary gear set is permanently coupled to the sun gear member of the fourth planetary gear set, the ring gear member of the first planetary gear set is permanently coupled to the sun gear member of the second planetary gear set, the ring gear member of the second planetary gear set is permanently coupled to the sun gear member of the third planetary gear set, the ring gear member of the third planetary gear set is permanently coupled to the planet carrier member of the fourth planetary gear set, the input member is permanently coupled to the planet carrier member of the first planetary gear set, and the output member is permanently coupled to the planet carrier member of the third planetary gear set.

The housing has a first area defined radially inward from an outer periphery of the planetary gear sets and axially bounded by the first wall and the first planetary gear set, a second area defined radially inward from the outer periphery of the planetary gear sets and axially bounded by the first and fourth planetary gear sets, a third area defined radially inward from the outer periphery of the planetary gear sets and axially bounded by the fourth and second planetary gear sets, a fourth area defined radially inward from the outer periphery of the planetary gear sets and axially bounded by the second and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall.

A first clutch is disposed in at least one of the third, fourth, and sixth areas, a second clutch is disposed in at least one of the second, third, fourth, and fifth areas, a third clutch is disposed in at least one of the fourth, fifth and sixth areas, a first brake is disposed in at least one of the first, second, and sixth areas, and a second brake is disposed in at least one of the first, second, third, fifth, and sixth areas.

In yet another aspect of the present invention, the first clutch is disposed in the third area, the second clutch is disposed in the fourth area, the third clutch is disposed in the fifth area, the first brake is disposed in the first area, and the second brake is disposed in the third area.

In yet another aspect of the present invention, a first clutch is disposed in at least one of the first, third, fourth, and fifth areas, a second clutch is disposed in at least one of the first, third, fourth, and fifth areas, a third clutch is disposed in at least one of the first, fourth, fifth and sixth areas, a first brake is disposed in at least one of the first, second, fifth, and sixth areas, a second brake is disposed in at least one of the first, second, third, fifth, and sixth areas, In yet another aspect of the present invention, the first clutch is disposed in the third area, the second clutch is disposed in the fourth area, the third clutch is disposed in the fifth area, the first brake is disposed in the second area, and the second brake is disposed in the second area.

In yet another aspect of the present invention, the transaxle includes an input member, an output member, a housing having a first wall, a second wall, and a third wall extending between the first and second walls. First, second, third and fourth planetary gear sets are disposed within the housing, wherein the fourth planetary gear set is adjacent the first wall, the third planetary gear set is adjacent second wall, the first planetary gear set is adjacent the fourth planetary gear set and the second planetary gear set is between the first and third planetary gear sets. Each planetary gear set has a sun gear member, a ring gear member, and a planet carrier member supporting a plurality of planet gears each configured to intermesh with both the sun gear member and the ring gear member, wherein the sun gear member of the first planetary gear set is permanently coupled to the sun gear member of the fourth planetary gear set, the ring gear member of the first planetary gear set is permanently coupled to the sun gear member of the second planetary gear set, the ring gear member of the second planetary gear set is permanently coupled to the sun gear member of the third planetary gear set, the ring gear member of the third planetary gear set is permanently coupled to the planet carrier member of the fourth planetary gear set, the input member is permanently coupled to the planet carrier member of the first planetary gear set, and the output member is permanently coupled to the planet carrier member of the third planetary gear set.

The housing has a first area defined radially inward from an outer periphery of the planetary gear sets and axially bounded by the first wall and the fourth planetary gear set, a second area defined radially inward from the outer periphery of the planetary gear sets and axially bounded by the fourth and first planetary gear sets, a third area defined radially inward from the outer periphery of the planetary gear sets and axially bounded by the first and second planetary gear sets, a fourth area defined radially inward from the outer periphery of the planetary gear sets and axially bounded by the second and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall.

A first clutch is disposed in at least one of the third, fourth, and sixth areas, a second clutch is disposed in at least one of the third, fourth, and fifth areas, a third clutch is disposed in at least one of the third, fourth, fifth and sixth areas, a first brake is disposed in at least one of the first, second, and sixth areas, and a second brake is disposed in at least one of the first, second, third, fifth, and sixth areas.

In yet another aspect of the present invention, the first clutch is disposed in the fourth area, the second clutch is disposed in the fourth area, the third clutch is disposed in the fifth area, the first brake is disposed in the first area, and the second brake is disposed in the first area.

In yet another aspect of the present invention, the transaxle includes an input member, an output member, a housing having a first wall, a second wall, and a third wall extending between the first and second walls. First, second, third and fourth planetary gear sets are disposed within the housing, wherein the fourth planetary gear set is adjacent the first wall, the third planetary gear set is adjacent second wall, the second planetary gear set is adjacent the fourth planetary gear set and the first planetary gear set is between the second and third planetary gear sets. Each planetary gear set has a sun gear member, a ring gear member, and a planet carrier member supporting a plurality of planet gears each configured to intermesh with both the sun gear member and the ring gear member, wherein the sun gear member of the first planetary gear set is permanently coupled to the sun gear member of the fourth planetary gear set, the ring gear member of the first planetary gear set is permanently coupled to the sun gear member of the second planetary gear set, the ring gear member of the second planetary gear set is permanently coupled to the sun gear member of the third planetary gear set, the ring gear member of the third planetary gear set is permanently coupled to the planet carrier member of the fourth planetary gear set, the input member is permanently coupled to the planet carrier member of the first planetary gear set, and the output member is permanently coupled to the planet carrier member of the third planetary gear set.

The housing has a first area defined radially inward from an outer periphery of the planetary gear sets and axially bounded by the first wall and the fourth planetary gear set, a second area defined radially inward from the outer periphery of the planetary gear sets and axially bounded by the fourth and second planetary gear sets, a third area defined radially inward from the outer periphery of the planetary gear sets and axially bounded by the first and second planetary gear sets, a fourth area defined radially inward from the outer periphery of the planetary gear sets and axially bounded by the first and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall.

A first clutch is disposed in at least one of the second, fourth, and sixth areas, a second clutch is disposed in at least one of the second, third, and sixth areas, a third clutch is disposed in at least one of the fourth, fifth and sixth areas, a first brake is disposed in at least one of the first, second, and sixth areas, and a second brake is disposed in at least one of the first, second, fifth, and sixth areas.

In yet another aspect of the present invention, the first clutch is disposed in the second area, the second clutch is disposed in the third area, the third clutch is disposed in the fifth area, the first brake is disposed in the first area, and the second brake is disposed in the first area.

In yet another aspect of the present invention, the transaxle includes an input member, an output member, a housing having a first wall, a second wall, and a third wall extending between the first and second walls. First, second, third and fourth planetary gear sets are disposed within the housing, wherein the fourth planetary gear set is adjacent the first wall, the first planetary gear set is adjacent second wall, the third planetary gear set is adjacent the fourth planetary gear set and the second planetary gear set is between the third and first planetary gear sets, each planetary gear set having a sun gear member, a ring gear member, and a planet carrier member supporting a plurality of planet gears each configured to intermesh with both the sun gear member and the ring gear member, and wherein the sun gear member of the first planetary gear set is permanently coupled to the sun gear member of the fourth planetary gear set, the ring gear member of the first planetary gear set is permanently coupled to the sun gear member of the second planetary gear set, the ring gear member of the second planetary gear set is permanently coupled to the sun gear member of the third planetary gear set, the ring gear member of the third planetary gear set is permanently coupled to the planet carrier member of the fourth planetary gear set, the input member is permanently coupled to the planet carrier member of the first planetary gear set, and the output member is permanently coupled to the planet carrier member of the third planetary gear set.

The housing has a first area defined radially inward from an outer periphery of the planetary gear sets and axially bounded by the first wall and the fourth planetary gear set, a second area defined radially inward from the outer periphery of the planetary gear sets and axially bounded by the fourth and third planetary gear sets, a third area defined radially inward from the outer periphery of the planetary gear sets and axially bounded by the third and second planetary gear sets, a fourth area defined radially inward from the outer periphery of the planetary gear sets and axially bounded by the second and first planetary gear sets, a fifth area defined radially inward from the outer periphery of the planetary gear sets and axially bounded by the first planetary gear set and the second wall, and a sixth area defined radially inward from the third wall and radially outward from the outer periphery of the planetary gear sets and axially bounded by the first wall and the second wall.

A first clutch is disposed in at least one of the second, third, and sixth areas, a second clutch is disposed in at least one of the third, fourth, and sixth areas, a third clutch is disposed in at least one of the third, fourth, fifth and sixth areas, a first brake is disposed in at least one of the first, second, and sixth areas, and a second brake is disposed in at least one of the first, second, third, and sixth areas.

In yet another aspect of the present invention, the first clutch is disposed in the second area, the second clutch is disposed in the fourth area, the third clutch is disposed in the sixth area, the first brake is disposed in the first area, and the second brake is disposed in the first area.

In yet another aspect of the present invention, the clutches and the brakes are selectively engageable to establish at least eight forward speed ratios and at least one reverse speed ratio between the input member and the output member.

The transaxle of claim 1 wherein the first clutch is selectively engageable to interconnect the planet carrier member of the second planetary gear set with at least one of the planet carrier member of the third planetary gear set and the output member, the second clutch is selectively engageable to interconnect at least one of the sun gear member of the second planetary gear set and the ring gear member of the first planetary gear set with at least one of the sun gear member of the third planetary gear set and the ring gear member of the second planetary gear set, the third clutch is selectively engageable to interconnect at least one of the sun gear member of the third planetary gear set and the ring gear member of the second planetary gear set with at least one of the planet carrier member of the first planetary gear set and the input member, the first brake is selectively engageable to interconnect at least one of the sun gear member of the first planetary gear set and the sun gear member of the fourth planetary gear set with the housing, and the second brake is selectively engageable to interconnect the ring gear member of the fourth planetary gear set with the housing.

In yet another aspect of the present invention, the transaxle includes a transfer gear train having a first transfer gear intermeshed with a second transfer gear, wherein the first transfer gear is rotatably fixed to the output member and the second transfer gear is rotatably fixed to an interconnecting shaft, a differential gear set for driving a pair of road wheels, a pinion gear rotatably fixed to the intermediate shaft, and an input differential gear in mesh with the pinion gear and configured to rotatably drive the differential gear set.

In yet another aspect of the present invention, the transaxle includes a power transfer assembly having a first transfer gear and a second transfer gear, wherein the first transfer gear is rotatably fixed to the output member and the second transfer gear is rotatably fixed to a drive shaft, a power transfer member rotatably coupling the first and second transfer gears for transferring rotational energy from the first transfer gear to the second transfer gear, a final drive planetary gear set coupled to the drive shaft for receiving a driving torque from the second transfer gear, and a differential gear set coupled to the final drive planetary gear set and to a pair of road wheels for receiving a final drive rotational torque and transferring the final drive torque to the pair of road wheels.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figures 4A, 4B:
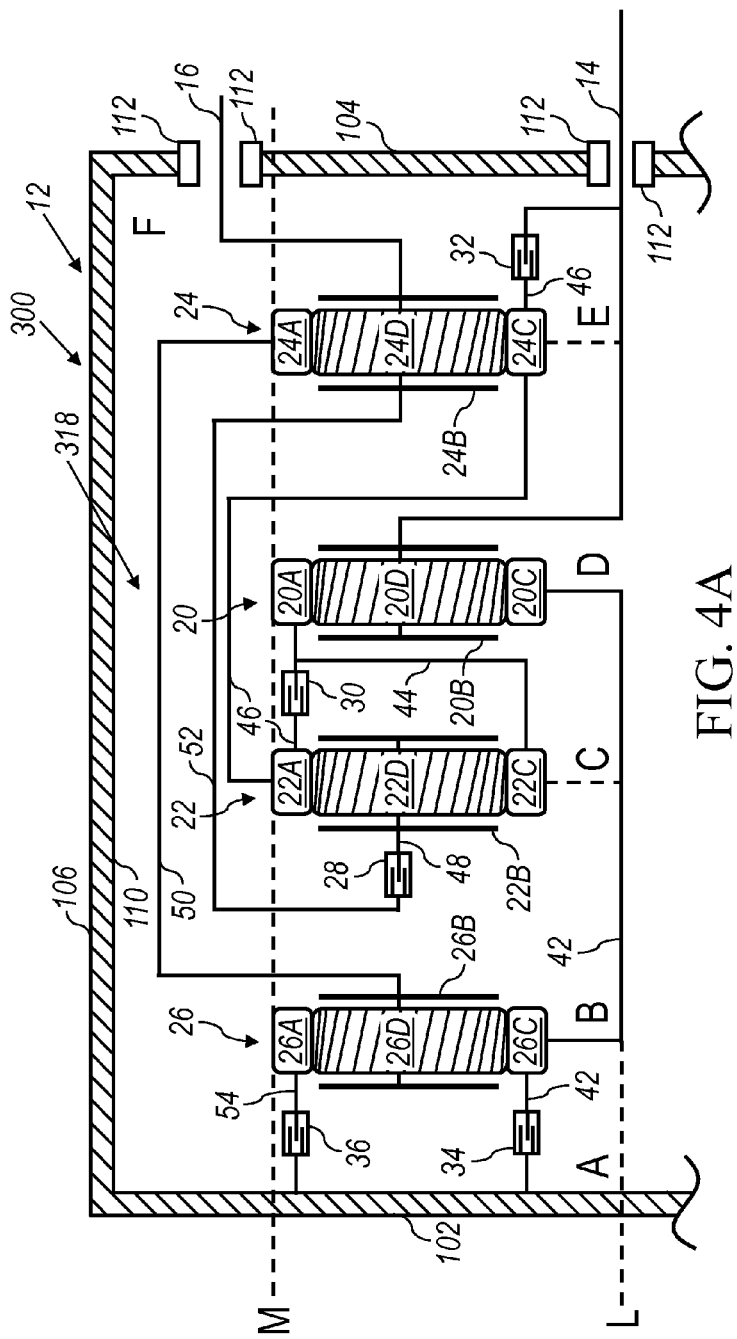
FIG. 4A is another schematic diagram of a gear arrangement for a front wheel drive transmission according to the principles of the present invention.
FIG. 4B is a chart showing the locations of the torque transmitting devices for the arrangement of planetary gear sets of the transmission shown in FIG. 4A, in accordance with the embodiments of the present invention.
Figures 5A, 5B:
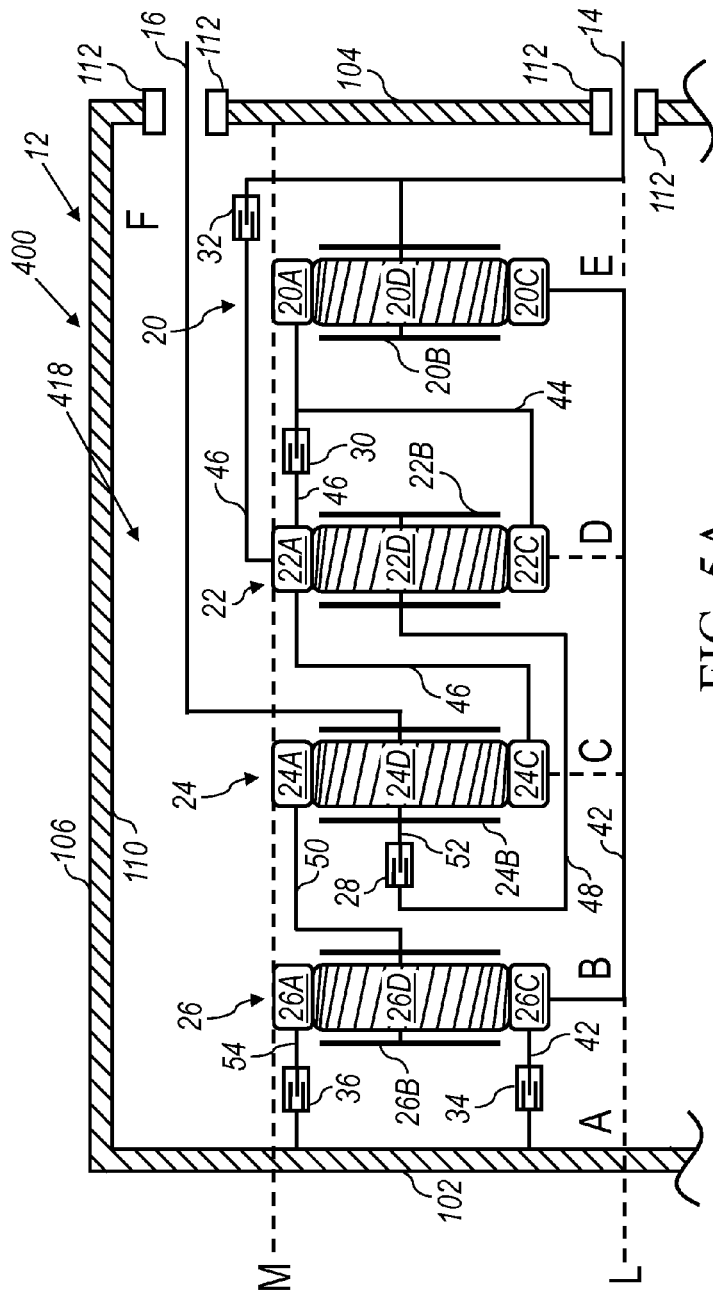
FIG. 5A is another schematic diagram of a gear arrangement for a front wheel drive transmission according to the principles of the present invention.
FIG. 5B is a chart showing the locations of the torque transmitting devices for the arrangement of planetary gear sets of the transmission shown in FIG. 5A, in accordance with the embodiments of the present invention.
Figure 6:
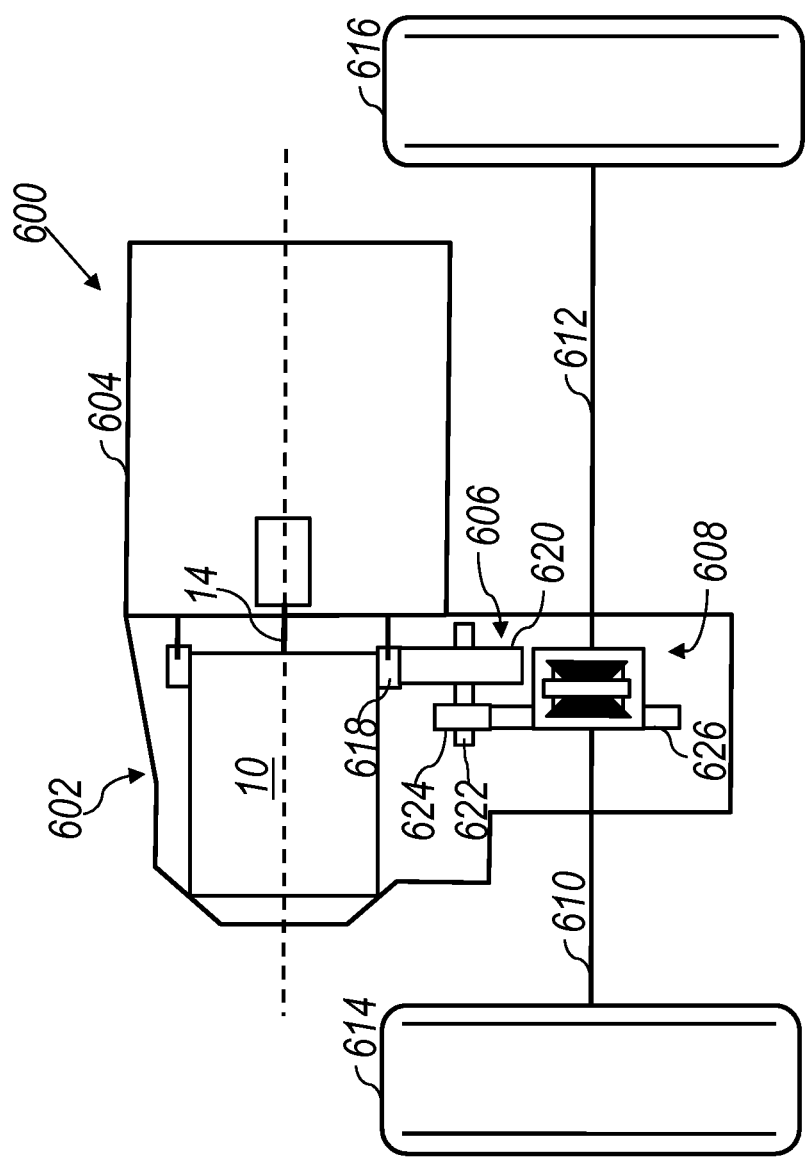
Figure 7:
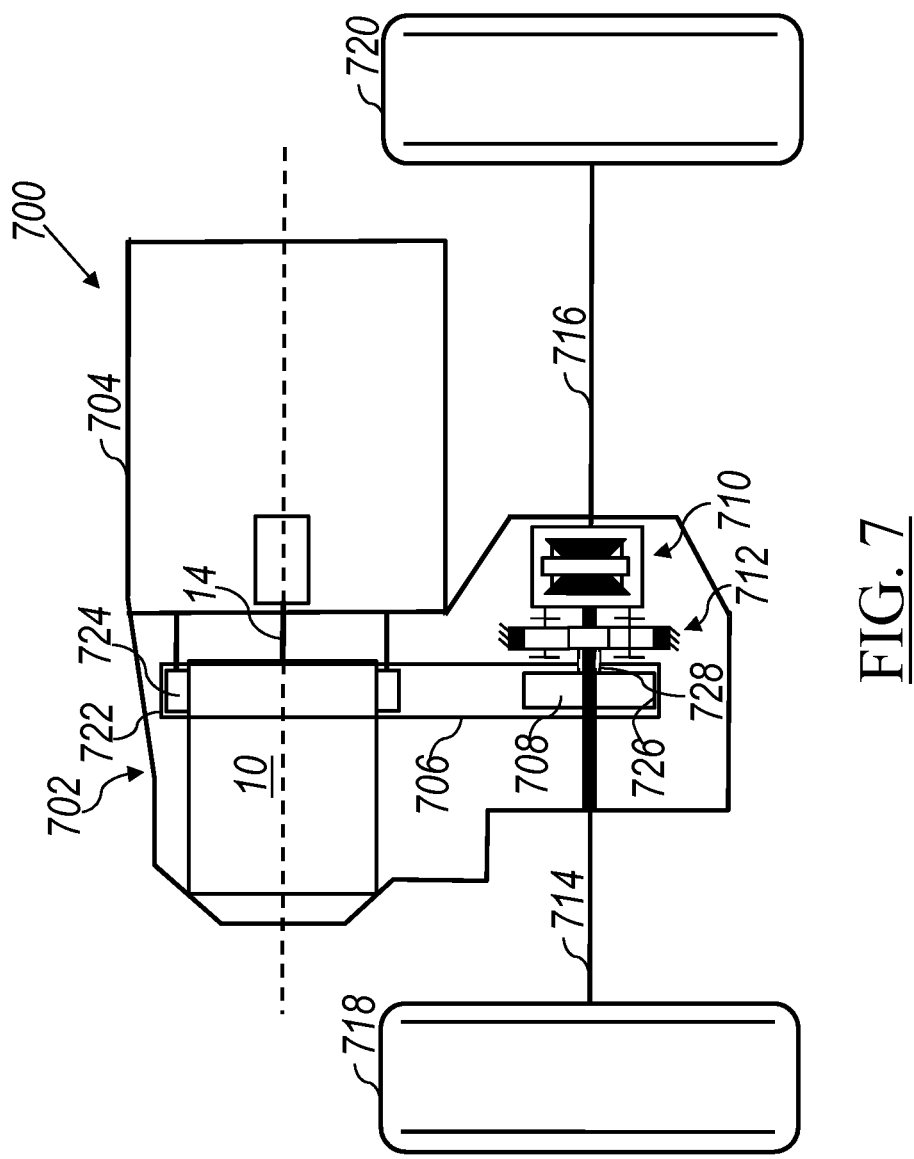

FIG. 6 is a schematic diagram of a front wheel drive transaxle arrangement incorporating the gear arrangement of the transmission of FIGS. 1A-5B, according to the principles of the present invention; and FIG. 7 is another schematic diagram of a front wheel drive transaxle arrangement incorporating the gear arrangement of the transmission of FIGS. 1A-5B, according to the principles of the present invention.

DETAILED DESCRIPTION

The following description is merely exemplary in nature and is not intended to limit the present disclosure, application, or uses.

Figures 1A, 1B:
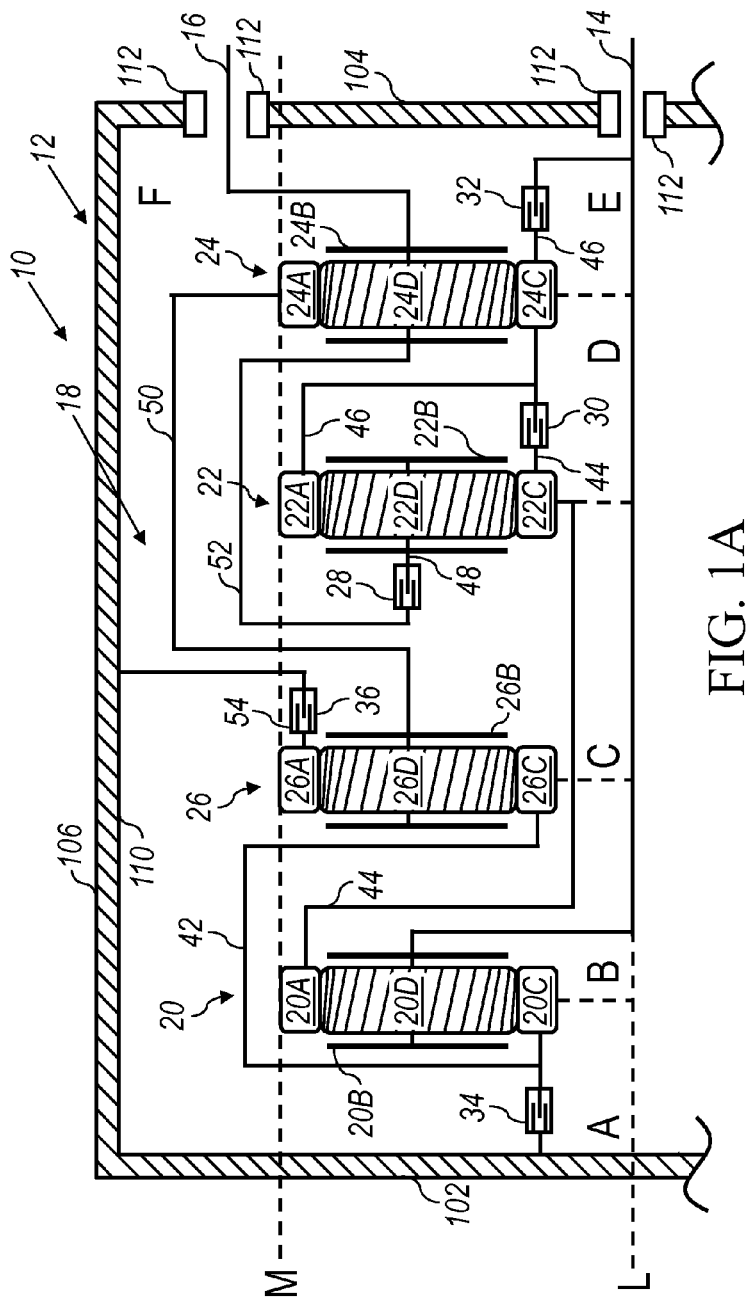
FIG. 1A is a schematic diagram of a gear arrangement for a front wheel drive transmission according to the principles of the present invention.
FIG. 1B is a chart showing the locations of the torque transmitting devices for the arrangement of planetary gear sets of the transmission shown in FIG. 1A, in accordance with the embodiments of the present invention.

Referring now to FIG. 1A, an embodiment of a front wheel drive multi-speed or eight speed transmission is generally indicated by reference number 10. The transmission 10 is illustrated as a front wheel drive or transverse transmission, though various other types of transmission configurations may be employed. The transmission 10 includes a transmission housing 12, an input shaft or member 14, an output shaft or member 16 and a gear arrangement 18. The input member 14 is continuously connected to an engine (shown in FIGS. 6 and 7) or to a turbine of a torque converter (not shown). The output member 16 is continuously connected with a final drive unit (not shown) or transfer case (shown in FIGS. 6 and 7).

The gear arrangement 18 of transmission 10 includes a first planetary gear set 20, a second planetary gear set 22, a third planetary gear set 24, and a fourth planetary gear set 26. The planetary gear sets 20, 22, 24 and 26 are connected between the input member 14 and the output member 16.

In a preferred embodiment of the present invention, the planetary gear set 20 includes a sun gear member 20C, a ring gear member 20A, and a planet carrier member 20B that rotatably supports a set of planet or pinion gears 20D (only one of which is shown). The sun gear member 20C is connected to a first shaft or interconnecting member 42. The ring gear member 20A is connected for common rotation with a second shaft or interconnecting member 44. The planet carrier member 20B is connected for common rotation with input shaft or member 14. The pinion gears 20D are configured to intermesh with the sun gear member 20C and the ring gear member 20A.

The planetary gear set 22 includes a ring gear member 22A, a planet carrier member 22B that rotatably supports a set of planet or pinion gears 22D and a sun gear member 22C. The ring gear member 22A is connected for common rotation with a third shaft or interconnecting member 46. The sun gear member 22C is connected for common rotation with the second shaft or interconnecting member 44. The planet carrier member 22B is connected for common rotation with a fourth shaft or interconnecting member 48. The pinion gears 22D are configured to intermesh with the sun gear member 22C and the ring gear member 22A.

The planetary gear set 24 includes a ring gear member 24A, a planet carrier member 24B that rotatably supports a set of planet or pinion gears 24D and a sun gear member 24C. The ring gear member 24A is connected for common rotation with a fifth shaft or interconnecting member 50. The sun gear member 24C is connected for common rotation with the third shaft or interconnecting member 46. The planet carrier member 24B is connected for common rotation with a sixth shaft or interconnecting member 52 and also the output member 16. The pinion gears 24D are configured to intermesh with the sun gear member 24C and the ring gear member 24A.

The planetary gear set 26 includes a sun gear member 26C, a ring gear member 26A, and a carrier member 26B that rotatably supports a set of planet or pinion gears 26D. The sun gear member 26C is connected for common rotation with the first shaft or interconnecting member 42. The ring gear member 26A is connected for common rotation with a seventh shaft or interconnecting member 54. The planet carrier member 26B is connected for common rotation with the fifth shaft or interconnecting member 50. The pinion gears 26D are configured to intermesh with the sun gear member 26C and the ring gear member 26A.

The transmission 10 also includes a plurality of torque-transmitting mechanisms or devices including a first clutch 28, a second clutch 30, a third clutch 32, a first brake 34 and a second brake 36. The first clutch 28 is selectively engagable to connect the fourth shaft or interconnecting member 48 to the sixth shaft or interconnecting member 52. The second clutch 30 is selectively engagable to connect the second shaft or interconnecting member 44 with the third shaft or interconnecting member 46. The third clutch 32 is selectively engagable to connect the third interconnecting member 46 with the input member 14. The first brake 34 is selectively engagable to connect the first shaft or interconnecting member 42 to the transmission housing 12 to restrict rotation of the first shaft or interconnecting member 42 relative to the transmission housing 12. Finally, the second brake 36 is selectively engagable to connect the seventh interconnecting member 54 to the transmission housing 12 to restrict rotation of the seventh interconnecting member 54 relative to the transmission housing 12.

The transmission 10 is capable of transmitting torque from the input shaft or member 14 to the output shaft or member 16 in at least eight forward torque ratios and one reverse torque ratio. Each of the forward torque ratios and the reverse torque ratio are attained by engagement of one or more of the torque-transmitting mechanisms (i.e. first clutch 28, second clutch 30, third clutch 32, first brake 34 and second brake 36). Those skilled in the art will readily understand that a different speed ratio is associated with each torque ratio. Thus, eight forward speed ratios may be attained by the transmission 10.

The transmission housing 12 includes a first wall or structural member 102, a second wall or structural member 104 and a third wall or structural member 106. The third wall 106 interconnects the first and second walls 102 and 104 to define a space or cavity 110. The input shaft or member 14 and output shaft or member 16 are supported by the second wall 104 by bearings 112. The planetary gear sets 20, 22, 24 and 26 and the torque-transmitting mechanisms 28, 30, 32, 34 and 36 are disposed within cavity 110. Further, the cavity 110 has a plurality of areas or zones A, B, C, D, E, and F in which the plurality of torque transmitting mechanisms 28, 30, 32, 34 and 36 will be specifically positioned or mounted, in accordance with the preferred embodiments of the present invention.

As shown in FIG. 1A, Zone A is defined by the area or space bounded by: the first wall 102, planetary gear set 20, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 20, the planetary gear set 26, radially outward by reference line "M", and radially inward by reference line "L". Zone C is defined by the area bounded by: the planetary gear set 26, the planetary gear set 22, radially outward by reference line "M", and radially inward by reference line "L". Zone D is defined by the area bounded by: the planetary gear set 22, the planetary gear set 24, radially outward by reference line "M", and radially inward by reference line "L". Zone E is defined by the area bounded by: the planetary gear set 24, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 18 of transmission 10 shown in FIG. 1A, the planetary gear set 20 is disposed closest to the first wall 102, the planetary gear set 24 is disposed closest to the second wall 104, the planetary gear set 26 is adjacent the planetary gear set 20, and the planetary gear set 22 is disposed between the planetary gear sets 24 and 26. The torque-transmitting mechanisms are intentionally located within specific Zones in order to provide advantages in overall transmission size, packaging efficiency, and reduced manufacturing complexity. In the particular example shown in FIG. 1A, the first clutch 28 is disposed in Zone C, the second clutch 30 is disposed in Zone D, the third clutch 32 is disposed in Zone E, the first brake 34 is disposed in Zone A, and the second brake 36 is disposed in Zone C.

However, the present invention contemplates other embodiments where the torque-transmitting mechanisms 28, 30, 32, 34 and 36 are disposed in the other Zones. The feasible locations of the torque-transmitting mechanisms 28, 30, 32, 34 and 36 within the Zones are illustrated in the chart shown in FIG. 1B. The chart of FIG. 1B lists clutches and the brakes in the left most column and the available zones to locate the clutch/brake in the top row. An "X" in the chart indicates that the present invention contemplates locating the clutch or brake in the zone listed in the top row. For example, second brake 36 may be located in Zones A, B, C, E, or F and first brake 34 may be located in zones A, B, or F.

Figures 2A, 2B:
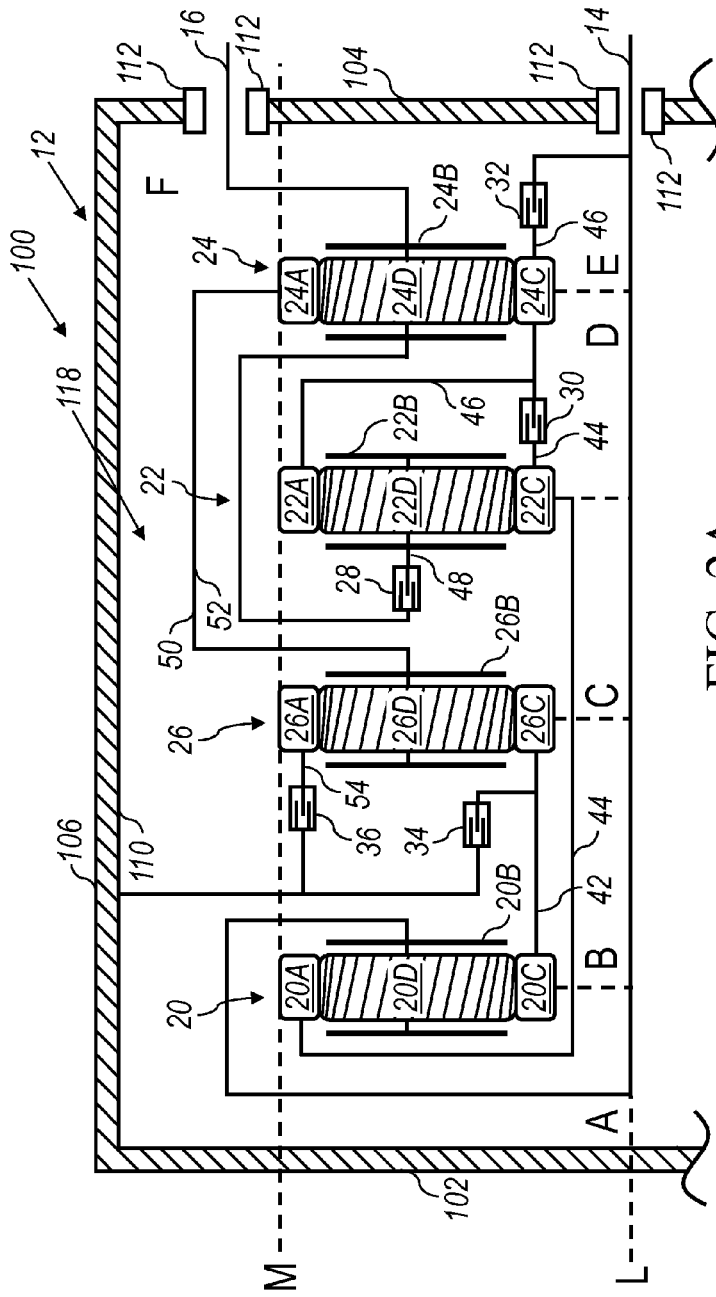
FIG. 2A is another schematic diagram of a gear arrangement for a front wheel drive transmission according to the principles of the present invention.
FIG. 2B is a chart showing the locations of the torque transmitting devices for the arrangement of planetary gear sets of the transmission shown in FIG. 2A, in accordance with the embodiments of the present invention.

Referring now to FIG. 2A, another embodiment of a transmission is generally indicated by reference number 100. The transmission 100 is similar to transmission 10 and like components are indicated by like reference numbers. However, the transmission 100 includes an alternate gear arrangement 118 where brakes 34 and 36 connect at a common location at the third wall 106 and interconnect with the planetary gear sets 20 and 26 on opposite sides than in the transmission 10. In addition, the second interconnecting member 44 connects with the planetary gear set 20 on an opposite side than in the transmission 10 and the input member 14 is disposed overtop and around the planetary gear set 20.

The torque-transmitting mechanisms are intentionally located within specific Zones in order to provide advantages in overall transmission size, packaging efficiency, and reduced manufacturing complexity. In the particular example shown in FIG. 2A, the first clutch 28 is disposed in Zone C, the second clutch 30 is disposed in Zone D, the third clutch 32 is disposed in Zone E, and the first brake 34 and the second brake 36 are disposed in Zone B.

However, the present invention contemplates other embodiments where the torque-transmitting mechanisms 28, 30, 32, 34 and 36 are disposed in the other Zones. The feasible locations of the torque-transmitting mechanisms 28, 30, 32, 34 and 36 within the Zones are illustrated in the chart shown in FIG. 2B. The chart of FIG. 2B lists clutches and brakes in the left most column and the available zones to locate the clutch/brake in the top row. An "X" in the chart indicates that the present invention contemplates locating the clutch or brake in the zone listed in the top row. For example, second brake 36 may be located in Zones A, B, C, E, or F and first brake 34 may be located in zones A, B, E, or F.

Figures 3A, 3B:
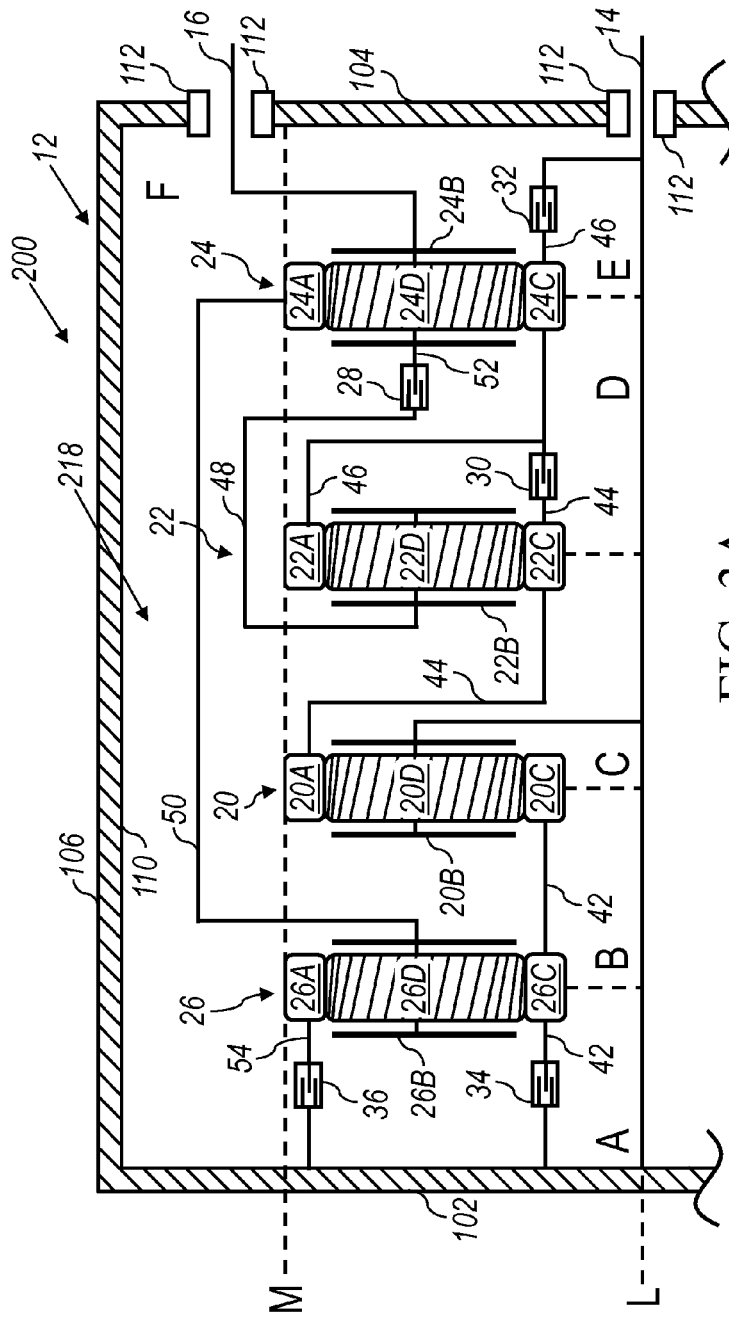
FIG. 3A is another schematic diagram of a gear arrangement for a front wheel drive transmission according to the principles of the present invention.
FIG. 3B is a chart showing the locations of the torque transmitting devices for the arrangement of planetary gear sets of the transmission shown in FIG. 3A, in accordance with the embodiments of the present invention.

Referring now to FIG. 3A, another embodiment of a transmission is generally indicated by reference number 200. The transmission 200 is similar to transmission 10 and like components are indicated by like reference numbers. However, as shown in FIG. 3A, Zone A is defined by the area or space bounded by: the first wall 102, planetary gear set 26, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 26, the planetary gear set 20, radially outward by reference line "M", and radially inward by reference line "L". Zone C is defined by the area bounded by: the planetary gear set 20, the planetary gear set 22, radially outward by reference line "M", and radially inward by reference line "L". Zone D is defined by the area bounded by: the planetary gear set 22, the planetary gear set 24, radially outward by reference line "M", and radially inward by reference line "L". Zone E is defined by the area bounded by: the planetary gear set 24, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 218 of transmission 200 shown in FIG. 3A, the planetary gear set 26 is disposed closest to the first wall 102, the planetary gear set 24 is disposed closest to the second wall 104, the planetary gear set 20 is adjacent the planetary gear set 26, and the planetary gear set 22 is disposed between the planetary gear sets 20 and 24. The torque-transmitting mechanisms are intentionally located within specific Zones in order to provide advantages in overall transmission size, packaging efficiency, and reduced manufacturing complexity. In the particular example shown in FIG. 3A, the first clutch 28 is disposed in Zone D, the second clutch 30 is disposed in Zone D, the third clutch 32 is disposed in Zone E, and the first brake 34 and the second brake 36 are disposed in Zone A.

However, the present invention contemplates other embodiments where the torque-transmitting mechanisms 28, 30, 32, 34 and 36 are disposed in the other Zones. The feasible locations of the torque-transmitting mechanisms 28, 30, 32, 34 and 36 within the Zones are illustrated in the chart shown in FIG. 3B. The chart of FIG. 3B lists clutches and brakes in the left most column and the available zones to locate the clutch/brake in the top row. An "X" in the chart indicates that the present invention contemplates locating the clutch or brake in the zone listed in the top row. For example, second brake 36 may be located in Zones A, B, C, E, or F and first brake 34 may be located in zones A, B, or F.

Referring now to FIG. 4A, another embodiment of a transmission is generally indicated by reference number 300. The transmission 300 is similar to transmission 10 and like components are indicated by like reference numbers. However, as shown in FIG. 4A, Zone A is defined by the area or space bounded by: the first wall 102, planetary gear set 26, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 26, the planetary gear set 22, radially outward by reference line "M", and radially inward by reference line "L". Zone C is defined by the area bounded by: the planetary gear set 22, the planetary gear set 20, radially outward by reference line "M", and radially inward by reference line "L". Zone D is defined by the area bounded by: the planetary gear set 20, the planetary gear set 24, radially outward by reference line "M", and radially inward by reference line "L". Zone E is defined by the area bounded by: the planetary gear set 24, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 318 of transmission 300 shown in FIG. 4A, the planetary gear set 26 is disposed closest to the first wall 102, the planetary gear set 24 is disposed closest to the second wall 104, the planetary gear set 22 is adjacent the planetary gear set 26, and the planetary gear set 20 is disposed between the planetary gear sets 22 and 24. The torque-transmitting mechanisms are intentionally located within specific Zones in order to provide advantages in overall transmission size, packaging efficiency, and reduced manufacturing complexity. In the particular example shown in FIG. 4A, the first clutch 28 is disposed in Zone B, the second clutch 30 is disposed in Zone C, the third clutch 32 is disposed in Zone E, and the first brake 34 and the second brake 36 are disposed in Zone A.

However, the present invention contemplates other embodiments where the torque-transmitting mechanisms 28, 30, 32, 34 and 36 are disposed in the other Zones. The feasible locations of the torque-transmitting mechanisms 28, 30, 32, 34 and 36 within the Zones are illustrated in the chart shown in FIG. 4B. The chart of FIG. 4B lists clutches and brakes in the left most column and the available zones to locate the clutch/brake in the top row. An "X" in the chart indicates that the present invention contemplates locating the clutch or brake in the zone listed in the top row. For example, second brake 36 may be located in Zones A, B, E, or F and first brake 34 may be located in zones A, B, or F.

Referring now to FIG. 5A, another embodiment of a transmission is generally indicated by reference number 400. The transmission 400 is similar to transmission 10 and like components are indicated by like reference numbers. However, as shown in FIG. 5A, Zone A is defined by the area or space bounded by: the first wall 102, planetary gear set 26, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 26, the planetary gear set 24, radially outward by reference line "M", and radially inward by reference line "L". Zone C is defined by the area bounded by: the planetary gear set 24, the planetary gear set 22, radially outward by reference line "M", and radially inward by reference line "L". Zone D is defined by the area bounded by: the planetary gear set 22, the planetary gear set 20, radially outward by reference line "M", and radially inward by reference line "L". Zone E is defined by the area bounded by: the planetary gear set 20, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 418 of transmission 400 shown in FIG. 5A, the planetary gear set 26 is disposed closest to the first wall 102, the planetary gear set 20 is disposed closest to the second wall 104, the planetary gear set 24 is adjacent the planetary gear set 26, and the planetary gear set 22 is disposed between the planetary gear sets 24 and 20. The torque-transmitting mechanisms are intentionally located within specific Zones in order to provide advantages in overall transmission size, packaging efficiency, and reduced manufacturing complexity. In the particular example shown in FIG. 5A, the first clutch 28 is disposed in Zone B, the second clutch 30 is disposed in Zone D, the third clutch 32 is disposed in Zone F, and the first brake 34 and the second brake 36 are disposed in Zone A.

However, the present invention contemplates other embodiments where the torque-transmitting mechanisms 28, 30, 32, 34 and 36 are disposed in the other Zones. The feasible locations of the torque-transmitting mechanisms 28, 30, 32, 34 and 36 within the Zones are illustrated in the chart shown in FIG. 5B. The chart of FIG. 5B lists clutches and brakes in the left most column and the available zones to locate the clutch/brake in the top row. An "X" in the chart indicates that the present invention contemplates locating the clutch or brake in the zone listed in the top row. For example, second brake 36 may be located in Zones A, B, C, or F and first brake 34 may be located in zones A, B, or F.

Referring now to FIG. 6, a front wheel drive powertrain 600 incorporating a transaxle 602 is illustrated, in accordance with the embodiments of the present invention. Transaxle 602 includes the transmission 10 having the gear arrangement 18 shown in FIGS. 1A and 1B. However, it should be appreciated that the transaxle 602 may incorporate any of the transmissions 10, 100, 200, 300, and 400 having any of the gear arrangements 18, 118, 218, 318, and 418 shown in FIGS. 1A through 5B without departing from the scope of the present invention. Transmission 10 is mounted to an engine 604. Engine 604 provides a driving torque through input shaft 14 to transmission 10. Engine 604 is generally an internal combustion engine, however, the present invention contemplates other types of engines such as electric and hybrid engines. Further, transaxle 602 includes a transfer gear train 606, a differential 608, and a pair of drive axles 610 and 612 that drive a pair of road wheels 614 and 616, respectively.

Transfer gear train 606 includes a first transfer gear 618 and a second transfer gear 620. Output shaft or member 16 is coupled to the first transfer or spur gear 618. First transfer gear 618 may be a straight spur gear having straight gear teeth or a helical gear having helical gear teeth. First transfer gear 618 meshes with the second transfer gear 620. Second transfer gear 620 is rotatably fixed to an interconnecting shaft or rotatable member 622. Further, a pinion 624 is mounted to shaft 622 and intermeshes with an input differential gear 626. Input differential gear 626 transfers driving torque to the differential 608. Differential 608, as conventionally known, transfers the driving torque generated by engine 604 to the two drive axles 610 and 612. Drive axles 610 and 612 are independently driven by differential 608 to supply the driving torque to the vehicle road wheels 614 and 616.

Referring now to FIG. 7, another embodiment of a front wheel drive powertrain 700 incorporating a transaxle 702 is illustrated, in accordance with the embodiments of the present invention. Transaxle 702 includes the transmission 10 having the gear arrangement 18 shown in FIGS. 1A and 1B. However, it should be appreciated that the transaxle 702 may incorporate any of the transmissions 10, 100, 200, 300, and 400 having any of the gear arrangements 18, 118, 218, 318, and 418 shown in FIGS. 1A through 5B without departing from the scope of the present invention. Transmission 10 is mounted to an engine 704. Engine 704 provides a driving torque through input shaft 14 to transmission 10. Further, transaxle 702 includes a transfer chain 706, a driven sprocket or gear 708, a differential 710, a final drive planetary gear set 712 and a pair of drive axles 714 and 716 that drive a pair of road wheels 718 and 720, respectively.

Transfer chain 706 engages at a first end 722 a drive sprocket or gear 724 and at a second end 726 the driven sprocket or gear 708. The drive sprocket 724 is coupled to output shaft or member 16. Driven sprocket 708 is rotatably fixed to a drive shaft or rotatable member 728. Further, drive shaft 728 is coupled to the sun gear of the final drive planetary gear set 712 to achieve the desired gear ratio. The final drive planetary gear set 712 transfers driving torque to the differential 710 though the carrier member of the final drive planetary gear set 712 to the housing of the differential 710. Differential 710, as conventionally known, transfers the driving torque generated by engine 704 to the two drive axles 714 and 716 through bevel gears of differential 710. Drive axles 714 and 716 are independently driven by differential 710 to supply the driving torque to the vehicle road wheels 718 and 720.

The description of the invention is merely exemplary in nature and variations that do not depart from the gist of the invention are intended to be within the scope of the invention. Such variations are not to be regarded as a departure from the spirit and scope of the invention.

What is claimed is:

1. A transaxle comprising:
an input member;
an output member;
a housing having a first wall, a second wall, and a third wall extending between the first and second walls;
first, second, third and fourth planetary gear sets disposed within the housing, wherein the first planetary gear set is adjacent the first wall, the third planetary gear set is adjacent second wall, the fourth planetary gear set is adjacent the first planetary gear set and the second planetary gear set is between the fourth and third planetary gear sets, each planetary gear set having a sun gear member, a ring gear member, and a planet carrier member supporting a plurality of planet gears each configured to intermesh with both the sun gear member and the ring gear member, and wherein the sun gear member of the first planetary gear set is permanently coupled to the sun gear member of the fourth planetary gear set, the ring gear member of the first planetary gear set is permanently coupled to the sun gear member of the second planetary gear set, the ring gear member of the second planetary gear set is permanently coupled to the sun gear member of the third planetary gear set, the ring gear member of the third planetary gear set is permanently coupled to the planet carrier member of the fourth planetary gear set, the input member is permanently coupled to the planet carrier member of the first planetary gear set, and the output member is permanently coupled to the planet carrier member of the third planetary gear set, and
wherein the housing has a first area defined radially inward from an outer periphery of the planetary gear sets and axially bounded by the first wall and the first planetary gear set, a second area defined radially inward from the outer periphery of the planetary gear sets and axially bounded by the first and fourth planetary gear sets, a third area defined radially inward from the outer periphery of the planetary gear sets and axially bounded by the fourth and second planetary gear sets, a fourth area defined radially inward from the outer periphery of the planetary gear sets and axially bounded by the second and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall,
a first clutch disposed in at least one of the third, fourth, and sixth areas;
a second clutch disposed in at least one of the first, third, fourth, and fifth areas;
a third clutch disposed in at least one of the first, fourth, fifth and sixth areas;
a first brake disposed in at least one of the first, second, fifth, and sixth areas;
a second brake disposed in at least one of the first, second, third, fifth, and sixth areas, and
wherein the clutches and the brakes are selectively engageable to establish at least eight forward speed ratios and at least one reverse speed ratio between the input member and the output member,
a transfer gear train having a first transfer gear intermeshed with a second transfer gear, wherein the first transfer gear is rotatably fixed to the output member and the second transfer gear is rotatably fixed to an intermediate shaft;
a differential gear set for driving a pair of road wheels;
a pinion gear rotatably fixed to the intermediate shaft; and
an input differential gear in mesh with the pinion gear and configured to rotatably drive the differential gear set.

2. The transaxle of claim 1 wherein the first clutch is selectively engageable to interconnect the planet carrier member of the second planetary gear set with at least one of the planet carrier member of the third planetary gear set and the output member, the second clutch is selectively engageable to interconnect at least one of the sun gear member of the second planetary gear set and the ring gear member of the first planetary gear set with at least one of the sun gear member of the third planetary gear set and the ring gear member of the second planetary gear set, the third clutch is selectively engageable to interconnect at least one of the sun gear member of the third planetary gear set and the ring gear member of the second planetary gear set with at least one of the planet carrier member of the first planetary gear set and the input member, the first brake is selectively engageable to interconnect at least one of the sun gear member of the first planetary gear set and the sun gear member of the fourth planetary gear set with the housing, and the second brake is selectively engageable to interconnect the ring gear member of the fourth planetary gear set with the housing.

3. The transaxle of claim 2 wherein the first clutch is disposed in the third area, the second clutch is disposed in the fourth area, the third clutch is disposed in the fifth area, the first brake is disposed in the second area, and the second brake is disposed in the second area.

4. A transaxle comprising:
an input member;
an output member;
a housing having a first wall, a second wall, and a third wall extending between the first and second walls;
first, second, third and fourth planetary gear sets disposed within the housing, wherein the first planetary gear set is adjacent the first wall, the third planetary gear set is adjacent second wall, the fourth planetary gear set is adjacent the first planetary gear set and the second planetary gear set is between the fourth and third planetary gear sets, each planetary gear set having a sun gear member, a ring gear member, and a planet carrier member supporting a plurality of planet gears each configured to intermesh with both the sun gear member and the ring gear member, and wherein the sun gear member of the first planetary gear set is permanently coupled to the sun gear member of the fourth planetary gear set, the ring gear member of the first planetary gear set is permanently coupled to the sun gear member of the second planetary gear set, the ring gear member of the second planetary gear set is permanently coupled to the sun gear member of the third planetary gear set, the ring gear member of the third planetary gear set is permanently coupled to the planet carrier member of the fourth planetary gear set, the input member is permanently coupled to the planet carrier member of the first planetary gear set, and the output member is permanently coupled to the planet carrier member of the third planetary gear set, and wherein the housing has a first area defined radially inward from an outer periphery of the planetary gear sets and axially bounded by the first wall and the first planetary gear set, a second area defined radially inward from the outer periphery of the planetary gear sets and axially bounded by the first and fourth planetary gear sets, a third area defined radially inward from the outer periphery of the planetary gear sets and axially bounded by the fourth and second planetary gear sets, a fourth area defined radially inward from the outer periphery of the planetary gear sets and axially bounded by the second and third planetary gear sets, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall, a first clutch disposed in at least one of the third, fourth, and sixth areas;

a second clutch disposed in at least one of the first, third, fourth, and fifth areas;

a third clutch disposed in at least one of the first, fourth, fifth and sixth areas;

a first brake disposed in at least one of the first, second, fifth, and sixth areas;

a second brake disposed in at least one of the first, second, third, fifth, and sixth areas, and wherein the clutches and the brakes are selectively engageable to establish at least eight forward speed ratios and at least one reverse speed ratio between the input member and the output member, a power transfer assembly having a first transfer gear and a second transfer gear, wherein the first transfer gear is rotatably fixed to the output member and the second transfer gear is rotatably fixed to a drive shaft;

a power transfer member rotatably coupling the first and second transfer gears for transferring rotational energy from the first transfer gear to the second transfer gear;

a final drive planetary gear set coupled to the drive shaft for receiving a driving torque from the second transfer gear; and a differential gear set coupled to the final drive planetary gear set and to a pair of road wheels for receiving a final drive rotational torque and transferring the final drive torque to the pair of road wheels.

5. The transaxle of claim 4 wherein the power transfer member is a chain or a belt.

6. The transaxle of claim 5 wherein the first clutch is selectively engageable to interconnect the planet carrier member of the second planetary gear set with at least one of the planet carrier member of the third planetary gear set and the output member, the second clutch is selectively engageable to interconnect at least one of the sun gear member of the second planetary gear set and the ring gear member of the first planetary gear set with at least one of the sun gear member of the third planetary gear set and the ring gear member of the second planetary gear set, the third clutch is selectively engageable to interconnect at least one of the sun gear member of the third planetary gear set and the ring gear member of the second planetary gear set with at least one of the planet carrier member of the first planetary gear set and the input member, the first brake is selectively engageable to interconnect at least one of the sun gear member of the first planetary gear set and the sun gear member of the fourth planetary gear set with the housing, and the second brake is selectively engageable to interconnect the ring gear member of the fourth planetary gear set with the housing.

7. The transaxle of claim 6 wherein the first clutch is disposed in the third area, the second clutch is disposed in the fourth area, the third clutch is disposed in the fifth area, the first brake is disposed in the second area, and the second brake is disposed in the second area.

8. A transaxle comprising:

an input member;

an output member;

a housing having a first wall, a second wall, and a third wall extending between the first and second walls;

first, second, third and fourth planetary gear sets disposed within the housing, wherein the first planetary gear set is adjacent the first wall, the third planetary gear set is adjacent second wall, the fourth planetary gear set is adjacent the first planetary gear set and the second planetary gear set is between the fourth and third planetary gear sets, each planetary gear set having a sun gear member, a ring gear member, and a planet carrier member supporting a plurality of planet gears each configured to intermesh with both the sun gear member and the ring gear member;

a first member continuously connecting the sun gear member of the first planetary gear set with the sun gear member of the fourth planetary gear set, wherein the first member is at least partially disposed axially between the first and fourth planetary gear sets;

a second member continuously connecting the ring gear member of the first planetary gear set with the sun gear member of the second planetary gear set, wherein the second member is at least partially disposed radially inwardly of the first member;

a third member continuously connecting the ring gear member of the second planetary gear set with the sun gear member of the third planetary gear set, wherein the third member is disposed at least partially axially between the second and third planetary gear sets;

a fourth member continuously connecting the ring gear member of the third planetary gear set with the planet carrier member of the fourth planetary gear set, wherein the fourth member is disposed radially outwardly of the third member;

a first clutch selectively engageable to interconnect the planet carrier member of the second planetary gear set with at least one of the planet carrier member of the third planetary gear set and the output member;

a second clutch selectively engageable to interconnect at least one of the sun gear member of the second planetary gear set and the ring gear member of the first planetary gear set with at least one of the sun gear member of the third planetary gear set and the ring gear member of the second planetary gear set;

a third clutch selectively engageable to interconnect at least one of the sun gear member of the third planetary gear set and the ring gear member of the second planetary gear set with at least one of the planet carrier member of the first planetary gear set and the input member;

a first brake selectively engageable to interconnect at least one of the sun gear member of the first planetary gear set and the sun gear member of the fourth planetary gear set with the housing; and a second brake selectively engageable to interconnect the ring gear member of the fourth planetary gear set with the housing, and wherein the clutches and the brakes are selectively engageable to establish at least eight forward speed ratios and at least one reverse speed ratio between the input member and the output member.

9. The transaxle of claim 8 wherein the input member is permanently coupled to the planet carrier member of the first planetary gear set.

10. The transaxle of claim 8 wherein the output member is permanently coupled to the planet carrier member of the third planetary gear set.

11. The transaxle of claim 8 wherein the input member and the output member are at least partially disposed through the second wall of the housing.

12. The transaxle of claim 8 wherein the first clutch is disposed radially inwardly of the fourth member.

13. The transaxle of claim 12 wherein the second clutch is disposed radially inwardly of the first, second, and fourth members.

14. The transaxle of claim 13 wherein the third clutch is disposed radially inwardly of the output member.

15. The transaxle of claim 14 wherein the first brake is disposed radially outwardly of the first and second members.

16. The transaxle of claim 15 wherein the second brake is disposed radially outwardly of the first and second members.

17. The transaxle of claim 8 further comprising:

a transfer gear train having a first transfer gear intermeshed with a second transfer gear, wherein the first transfer gear is rotatably fixed to the output member and the second transfer gear is rotatably fixed to an intermediate shaft;

a differential gear set for driving a pair of road wheels;

a pinion gear rotatably fixed to the intermediate shaft; and an input differential gear in mesh with the pinion gear and configured to rotatably drive the differential gear set.

18. The transaxle of claim 8 further comprising:

a power transfer assembly having a first transfer gear and a second transfer gear, wherein the first transfer gear is rotatably fixed to the output member and the second transfer gear is rotatably fixed to a drive shaft;

a power transfer member rotatably coupling the first and second transfer gears for transferring rotational energy from the first transfer gear to the second transfer gear;

a final drive planetary gear set coupled to the drive shaft for receiving a driving torque from the second transfer gear; and a differential gear set coupled to the final drive planetary gear set and to a pair of road wheels for receiving a final drive rotational torque and transferring the final drive torque to the pair of road wheels.

* * * * *